3,169,322
COMBINED GAGE AND SAMPLER DEVICE
Joseph V. Mile, 2026 Kay Ave., Union, N.J.
Filed July 17, 1961, Ser. No. 124,399
5 Claims. (Cl. 33—126.4)

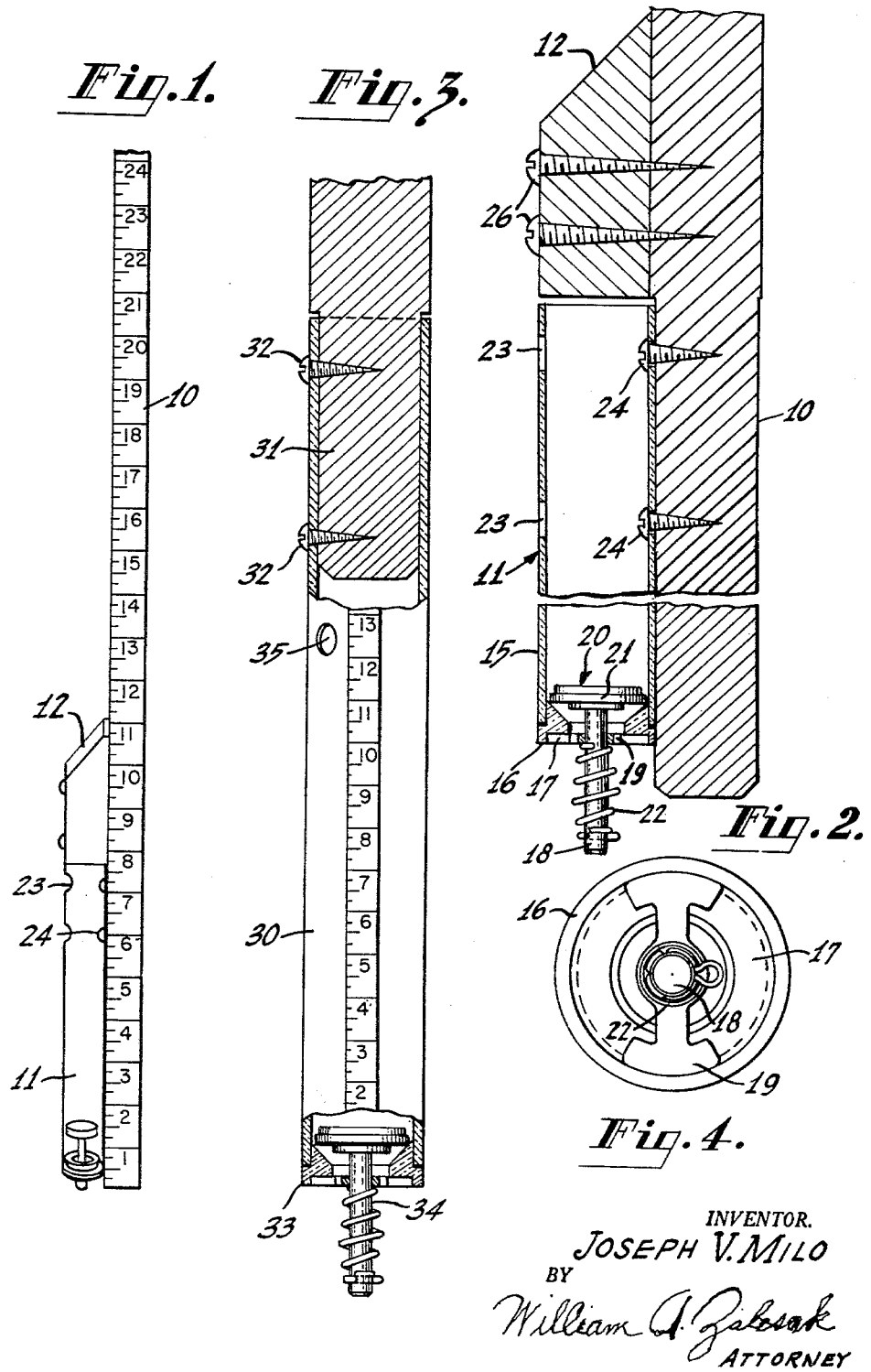

My invention relates to a combined gage and sampler, more specifically to a device for determining the amount of water, if any, in a storage tank and the amount of stored fluid such, for example, as gasoline, oil or the like.

While devices of this kind are generally available, they are usually of such design as to either measure the total amount of the liquid in the storage tank or sample only the amount of water in the storage tank. Usually the device is either a form of measuring stick or a sampler which is of special design, sometimes complicated. A simply constructed device for measuring water content and stored liquid which can be made from readily available parts, and which is rugged to take rough handling, has not heretofore been available.

It is an object of my invention to provide a new and improved gage and sampling device which is capable of measuring and sampling the water content of storage tanks and measuring the amount of liquid stored.

A further object of my invention is to provide such a device which is simple and rugged, easily assembled and repaired and which utilizes standard parts readily available or which can be fabricated from standard items such as plastic tubular materials, valves, available measuring sticks and other items required for assembly.

Referring to the drawings:

FIG. 1 is a perspective view of a device made according to my invention;

FIG. 2 is a partial longitudinal section, enlarged, showing details of the device shown in FIG. 1;

FIG. 3 is a side elevation partially in section of a modification of the device shown in FIG. 1; and FIG. 4 is a bottom view, enlarged, of the sampling assembly of the device shown in FIGS. 1, 2 and 3.

Referring to the drawings, the device made according to my invention and as shown in FIGS. 1 and 2, includes a conventional measuring gage stick 10 to the bottom of which is attached a sampling gage assembly 11 protected by the tapered guard 12, the purpose of this guard being to prevent accidental engagement of the upper end of the sampling gage assembly with the opening to the tank through which the device is projected.

As best shown in FIG. 2, the sampling gage assembly 11 includes an elongated tubular member 15 preferably of transparent plastic. The lower end of the tubular member 15 is closed by a valve seat member 16 also preferably of plastic, received within and cemented to the lower end of the tubular member 15. The outside or bottom surface of the valve seat element 16 is provided with a recess 17 which receives therewithin a stem support cross piece member 19 preferably of metal and fixed to the valve seat member 16. The valve assembly, comprising the valve stem 18, is slidably received by the member 19. The upper end of the valve stem 18 is provided with the head assembly 20 including the washer 21 which may be made of some material which is not subject to attack by liquid fuels or water. A biasing spring 22 fixed between the lower end of the stem 18 and the stem support member 19 biases the valve to closed position.

The lower end of the gage assembly is so positioned that when the stem 18 abuts the bottom of the tank being sampled, that the lower end of the stick and the outer end of the stem register with each other.

The tubular member 15 is provided with openings 23 to permit trapped air to escape and the liquid to rise rapidly within the tubular member. The tubular member 15 is fixed to the gage stick by means of screws 24 which can be inserted through openings 23 to fasten the member 15 to the stick.

To insure that the tubular member 15 is not inadvertently engaged with the inside of the tank when the sampling assembly is removed for checking, I provide a tapered guard member 12 secured to the stick by means of screw elements 26. This guard is tapered outwardly so as to cause the stick to move radially inwardly of any opening to insure that the stick is readily removed. The guard is positioned closely adjacent the upper end of the tubular member 15.

In the modification shown in FIG. 3, the tubular member 30 receives within the upper end thereof the lower end of the gage stick 31 and is secured thereto by means of the screws 32. The tubular member 30 is provided with apertures such as 35 to permit ready flow of fluid to the tubular member 30 when the valve 34 is opened. The valve seat 33 is similar to that shown at 16 in FIG. 2 and other details of the valve stem assembly are substantially the same as those shown in FIG. 2.

Most of the elements which provide the combination described and claimed are readily available as standard items and may be readily assembled. The device is simple and rugged and quickly determines water content as well as other liquid content by subtracting the height of the water column from the total liquid volume measured on the stick and readily converted to, for example, gallons if this is the unit of measure being used.

What is claimed is:

1. A combination gage and sampling device for determining water and other liquid content of a storage tank including a transparent tubular member, one end of said tubular member being closed by a valve seat fixed to said end, said valve seat having a recess on the outer side thereof, a cross piece stem support mounted in said recess and fixed to the outer side of said valve seat, a valve stem slidably mounted in said stem support and having a valve head fixed to the inner end of the stem and spring biasing means fixed between the outer end of said stem and said stem support, a gage stick, said tubular member being fixed to said gage stick at one end thereof, said tubular member retaining water upon withdrawal to the depth of the water in said storage tank which has been sampled and indicating on the gage stick the total depth of the water and other liquid supply whereby the amount of other liquid supply can be determined.

2. A combination gage and sampling device for determining water content and other liquid supply within a storage tank including a transparent tubular member of plastic material, one end of said tubular member being closed by a plastic valve seat fixed to said end, said valve seat having a recess on the outer side thereof, a metal cross piece stem support mounted in said recess and fixed to the outer side of said valve seat, a valve stem mounted in said stem support and having a valve head fixed to the inner end of the stem and spring biasing means fixed between the outer end of said stem and said stem support, a gage stick having a guard member thereon, said tubular member being fixed to said gage stick, the end of said gage stick and the outer end of said valve stem registering with each other when said stem is pushed to completely open the valve, the end of said tubular member opposite said valve seat being closed by said guard member, said tubular member having an opening adjacent said guard member, said tubular member retaining water upon withdrawal to the depth of the water in said storage tank which has been sampled and indicating on the gage stick the total depth of the water and other liquid supply whereby the amount of other liquid supply can also be determined.

3. A combination gage and sampling device for determining water and other liquid content of a storage tank, said device including a transparent tubular member of plastic material, one end of said tube being closed by a plastic valve seat fixed to said end, said valve seat having a recess in the outer face thereof, a metal cross piece stem support mounted within and fixed to the outer face of said valve seat, a valve stem having a valve head fixed to the inner end of the stem and spring biasing means fixed between the outer end of said stem and said stem support, a gage stick, said tubular member being fixed to said gage stick, the end of said tubular member opposite said valve seat being closed, said tubular member having an opening adjacent said closed end, said tubular member retaining water upon withdrawal to the depth of the water in a storage tank being sampled and indicating on the gage stick the total depth of the water and other liquid whereby the amount of other liquid can be determined.

4. A combination gage and sampling device for determining water and other liquid contents of a storage tank, said device including a transparent tubular member, one end of said tubular member being closed by a molded plastic valve seat fixed to said end, a cross piece stem support fixed to the outer side of said valve seat, a valve stem slidably mounted in said stem support and having a valve head fixed to the inner end of the stem and spring biasing means fixed between the outer end of said stem and said stem support, a gage stick having a guard member fixed thereto, said tubular member being fixed to said gage stick, the end of said tubular member opposite said valve seat being adjacent said guard member, said tubular member having an opening adjacent said guard member, said tubular member retaining water upon withdrawal to the depth of the water in said storage tank which has been sampled and indicating on the gage stick the total depth of the water and other liquid contents whereby the amount of other liquid contents can also be determined.

5. A combination gage and sampling device for determining water and other liquid content of storage tanks, said device including a transparent tubular member of plastic material, one end of said tubular member being closed by a plastic valve seat fixed to said end, said valve seat having a recess in the outer face thereof, a metal cross piece stem support received within said recess and fixed to the outer face of said valve seat, a valve stem slidably mounted in said stem support and having a valve head fixed to the inner end of the stem and spring biasing means fixed between the outer end of said stem and said stem support, a gage stick having a guard member, said tubular member being fixed to said gage stick, the end of said tubular member opposite said valve seat being closed by said guard member, said guard member having its end opposite said tubular member tapered away from said gage stick, said tubular member retaining water upon withdrawal to the depth of the water in a storage tank which has been sampled and indicating on the gage stick the total depth of the water and other liquid supply whereby the amount of liquid supply can be determined.

References Cited in the file of this patent

UNITED STATES PATENTS

| | | |
|---|---|---|
| 2,203,019 | Johnson et al. | June 4, 1940 |
| 2,468,218 | Markham | Apr. 26, 1949 |
| 2,634,612 | Quist | Apr. 14, 1953 |

FOREIGN PATENTS

| | | |
|---|---|---|
| 3,719 | Great Britain | Feb. 14, 1912 |
| 24,402 | Great Britain | Nov. 1, 1906 |